United States Patent [19]

Iwasawa et al.

[11] Patent Number: 4,833,606
[45] Date of Patent: May 23, 1989

[54] COMPILING METHOD FOR VECTORIZING MULTIPLE DO-LOOPS IN SOURCE PROGRAM

[75] Inventors: Kyoko Iwasawa, Tokyo; Yoshikazu Tanaka, Omiya, both of Japan

[73] Assignee: Hitachi, Ltd., Tokyo, Japan

[21] Appl. No.: 106,120

[22] Filed: Oct. 7, 1987

[30] Foreign Application Priority Data

Oct. 9, 1986 [JP] Japan .............................. 61-239007

[51] Int. Cl.$^4$ .............................................. G06F 9/00
[52] U.S. Cl. ................... 364/300; 364/280.4; 364/232.21; 364/232.22
[58] Field of Search ... 364/300, 200, 900, 200 MS File, 364/900 MS File

[56] References Cited

U.S. PATENT DOCUMENTS

| | | | |
|---|---|---|---|
| 4,330,822 | 5/1982 | Dodson | 364/200 |
| 4,374,408 | 2/1983 | Bowles et al. | 364/200 |
| 4,435,753 | 3/1984 | Rizzi | 364/200 |
| 4,437,184 | 3/1984 | Cork et al. | 364/200 |
| 4,456,958 | 6/1984 | De Santis et al. | 364/200 |
| 4,463,423 | 7/1984 | Potash et al. | 364/200 |
| 4,466,061 | 8/1984 | De Santis et al. | 364/200 |
| 4,468,736 | 8/1984 | De Santis et al. | 364/200 |
| 4,567,574 | 1/1986 | Saadé et al. | 364/900 |
| 4,692,896 | 9/1987 | Sakoda et al. | 364/900 |
| 4,710,867 | 12/1987 | Watanabe | 364/200 |
| 4,710,872 | 12/1987 | Scarborough | 364/300 |

OTHER PUBLICATIONS

Miller, Terrence C., "Tentative Compilation: A Design for an APL Compiler", ACM, 1979, pp. 88–95.
SIGPLAN Principles of Programming Languages, Jan. 1981, pp. 207–218.

*Primary Examiner*—Thomas M. Heckler
*Assistant Examiner*—Adolfo Ruiz
*Attorney, Agent, or Firm*—Fay, Sharpe, Beall, Fagan, Minnich & McKee

[57] ABSTRACT

A compiling method is provided for vectorizing outer sides of multiple loops which are not tight. The method detects variables which are defined in one loop and referenced by another. The information, mapped into a dependence graph, is used to analyze the data dependency of each loop level and expand the source program. The value of the variable is substituted for an appropriate element of the array and the value of the appropriate element of the array is substituted for an original variable. The compiler inserts control statements to assure initial values and end values for the loops are preserved minimizing the size of the working arrays, and vectorizing multiple loops for each loop level.

7 Claims, 8 Drawing Sheets

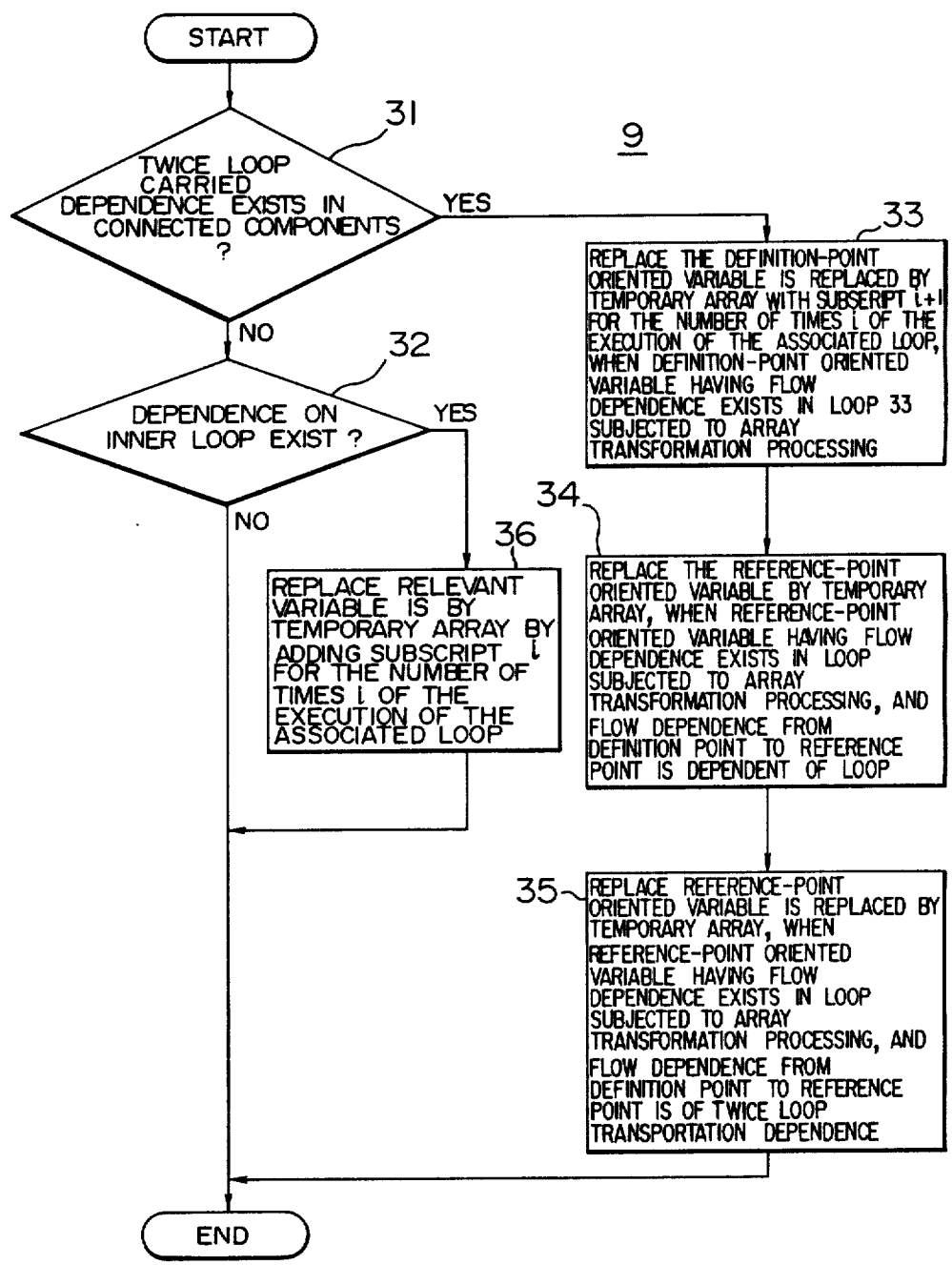

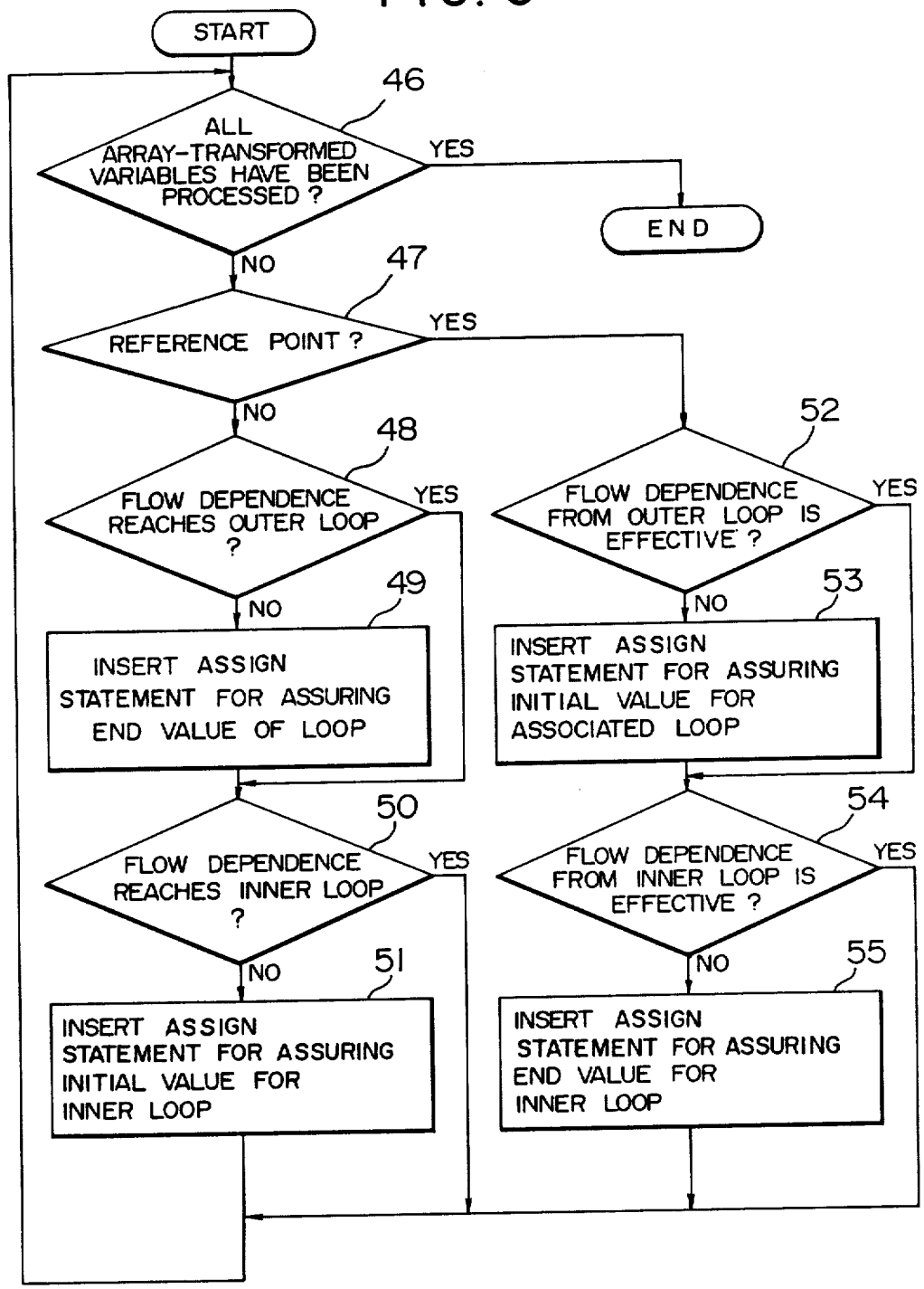

FIG. 6A

```
     DO 10 I = 1, N
         :                  ⎯19'
       TVI(I) = ...
              ⎯27'
         S = TVI(I)  ⎯56
       ⎡ DO 20 J = 1, M
       ⎢    :
       ⎢          ⎯20
       ⎢   = ··· + S + ···
       ⎢    :
       ⎣ 20 CONTINUE
     10 CONTINUE
     S = TVI(N)  ⎯60
     = ··· + S + ···
```

FIG. 6B

```
     S = ···
       :
     TVI(1) = S  ⎯64
     ⎡ DO 10 I = 1, N
     ⎢    :              ⎯21'
     ⎢    = ··· + TVI(I) + ···
     ⎢       ⎯28'
     ⎢    :
     ⎢  ⎡ DO 20 J = 1, M
     ⎢  ⎢    :
     ⎢  ⎢   S = ···  ⎯22
     ⎢  ⎢    :
     ⎢  ⎣ 20 CONTINUE
     ⎢   TVI(I+1) = S  ⎯57
     ⎣ 10 CONTINUE
     S = TVI(N+1)  ⎯61
     = ··· + S + ···
```

FIG. 6C

```
     ⎡ DO 10 I = 1, N
     ⎢  ⎡ DO 20 J = 1, M
     ⎢  ⎢    :
     ⎢  ⎢   S = ···  ⎯23
     ⎢  ⎢    :
     ⎢  ⎣ 20 CONTINUE
     ⎢   TVI(I) = S  ⎯58
     ⎢        ⎯29'
     ⎢    = ··· + TVI(I) + ···  ⎯24'
     ⎢    :
     ⎣ 10 CONTINUE
     S = TVI(N)  ⎯62
     = ··· + S + ···
```

FIG. 6D

```
     S = ···
       :
     TVI(1) = S  ⎯65
     ⎡ DO 10 I = 1, N  ⎯59
     ⎢   S = TVI(I)
     ⎢  ⎡ DO 20 J = 1, M
     ⎢  ⎢    :
     ⎢  ⎢   = ··· + S + ···  ⎯25
     ⎢  ⎢    :
     ⎢  ⎣ 20 CONTINUE
     ⎢    ⎯30'
     ⎢    :
     ⎢   TVI(I+1) = ···  ⎯26'
     ⎣ 10 CONTINUE
     S = TVI(N+1)  ⎯63
     = ··· + S + ···
```

FIG. 7A

```
 ┌ DO 10 I = 1, N
 │    TVI(I) = ···     ~19'
 └ 10 CONTINUE

┌ DO 11 I = 1, N
 │    S = TVI(I)       ~56
 │    ┌ DO 20 J = 1, M
 │    │   = ··· + S + ···   ~20
 │    └ 20 CONTINUE
 └ 11 CONTINUE
      S = TVI(N)       ~60
      = ··· + S + ···
```

FIG. 7B

```
      S = ···
      TVI(1) = S       ~64
 ┌ DO 10 I = 1, N
 │    ┌ DO 20 J = 1, M
 │    │   S = ···      ~22
 │    └ 20 CONTINUE
 │    TVI(I+1) = S     ~57
 └ 10 CONTINUE

┌ DO 11 I = 1, N     ~21'
 │    = ··· + TVI(I) + ···
 └ 11 CONTINUE         ~61
      S = TVI(N+1)
      = ··· + S + ···
```

FIG. 7C

```
 ┌ DO 10 I = 1, N
 │    ┌ DO 20 J = 1, M
 │    │   S = ···      ~23
 │    └ 20 CONTINUE
 │    TVI(I) = S       ~58
 └ 10 CONTINUE

┌ DO 11 I = 1, N     ~24'
 │    = ··· + TVI(I) + ···
 └ 11 CONTINUE
      S = TVI(N)       ~62
      = ··· + S + ···
```

FIG. 7D

```
      S = ···
      TVI(1) = S
 ┌ DO 10 I = 1, N     ~26'
 │    TVI(I+1) = ···
 └ 10 CONTINUE

┌ DO 11 I = 1, N     ~59
 │    S = TVI(I)
 │    ┌ DO 20 J = 1, M
 │    │   = ··· + S + ···   ~25
 │    └ 20 CONTINUE
 └ 11 CONTINUE
      S = TVI(N+1)     ~63
      = ··· + S + ···
```

COMPILING METHOD FOR VECTORIZING MULTIPLE DO-LOOPS IN SOURCE PROGRAM

BACKGROUND OF THE INVENTION

The present invention relates generally to a compiler system for creating object codes which allow a super computer to perform vectorization processing starting from a source program. More particularly, the present invention is concerned with a program translation system or method capable of creating an object code or program having a high efficiency of execution by resorting to the vectorization processing of outer one of multiple do-loops in a program in which the innermost loop is executed only at a low ratio.

In the super computer such as, for example, "Super Computer S 810" commercially available from the assignee of the present application, there are incorporated vector registers which can hold simultaneously individual elements of arrays and vector operation units for executing arithmetic operations on the vector registers at a high speed. By making use of the vector register and the vector operation unit effectively, it is possible to execute at a high speed the processing required for the loop which is to be executed repeatedly in a source program. The term "vectorization" used herein means the translation or transformation of the repetive loop of the source program into an object code which can be executed by using the vector register and the vector operation unit. Further, the ratio of a part which is executed by the vector operation unit to the whole program is termed "ratio of vectorization".

In the super computer, it is generally known that higher execution efficiency can be attained for the object code when the ratio of vectorization is high. In the hitherto known compiler, the innermost loop has been subject to the vector operation and numerous program translations are adopted for the vectorizations of the innermost loop. Of these translations, there is known an expansion procedure for substituting arrays for variables, as exemplified below:

```
       DO 10    I    = 1, 100
                S    = X(I)/Y(I)
   10           B(I) = S * A(I) + S
```

The object code obtained from the source program through the straightforward vectorization undergoes the processing described below. In the first place, values of the 1st to 100-th elements of the arrays X and Y are loaded into the associated vector registers, being followed by division for each of the elements, wherein the finally obtained results are placed in the variables S. Subsequently, the 1st to 100-th elements of the array A are loaded in the vector registers and multiplied with the contents of the variable S, the resulting values being then transferred from the vector register to the array B in a storage to be stored at the 1st to 100-th elements of the array B. This procedure is equivalent to the program translation mentioned below:

```
       DO 10    I    = 1, 100
   10           S    = X(I)/Y(I)
       DO 11    I    = 1, 100
   11           B(I) = S * A(I) + S
```

However, straightforward execution will result in that only the value of $S = X(100)/Y(100)$ obtained upon completion of the loop "DO 10" can be used in the arithmetic operation for the loop "DO 11", which means that the result of the arithmetic operation differs from what can be obtained from execution of the program which has not undergone the transformation. Accordingly, in order to allow the same arithmetic operation as the one before the transformation to be performed, it is necessary to substitute arrays for the variable S for preserving all the values of $I = 1, 100$ so that they can be used in the execution of the "DO 11" loop. The expansion for the substitution may be made as follows:

```
       DO 10    I    = 1, 100
   10           S'(I) = X(I)/Y(I)
       DO 11    I    = 1, 100
   11           B(I) = S'(I) * A(I) + S'(I)
```

The transformation of the variables to the arrays as exemplified above is referred to as "expansion". In this context, the array such as "S" generated by the compiler is referred to as "temporary array". As the article concerning the expansion procedure published latest, there may be mentioned Kuck et al's "Dependence Graphs and Compiler Optimization", SIGPLAN, Principles of Programming Languages, Jan. 1981, p.p. 207–218.

In the article mentioned above, discussion is made on the system for expansion only of the variables that make appearance in the innermost loop of multiple loops. More specifically, when a loop of concern is the innermost one of the multiple loops in a number of n, the variables are substituted for the n-dimensional arrays, as exemplified below:

```
       DO 20    I    = 1, N
                S    = Y(I)/X(I)
       DO 10    J    = 1, N
                P    = A(I, J) + X(J)
                B(I, J) = P * S/A(I, J)
   10    CONTINUE
   20    CONTINUE
```

Obviously, discussion is made on the expansion of "P" and no consideration is paid to the variable such as "S" which makes appearance over two loops.

With the prior art compiler, the variable can be replaced by the array for the innermost loop to thereby generate the object code for permitting the arithmetic operation to be executed by means of the vector operation unit in the same manner as the serial execution. However, in order to enhance the efficiency of execution for the object code, not only the innermost one of the multiple loops but also the outer adjacent loop must be susceptible to the vector operation. By way of example, in the case of a program

```
DO 30  I  = 1, N   ⎫
       S  = ...    ⎬ Outer
       A(I) = ...  ⎭

DO 20  J  = 1, M        ⎫
       X  = ... + S + ..., ⎬ Innermost
20     S  = ...         ⎭

30     B(I) = ... + S + ...} Outer
``` the variables S in the innermost loop can be replaced by the arrays for allowing the vector processing. However with the prior art compiler, no consideration is given to the variable S in the outer loop, thus giving rise to a serious problem that the vector operation according to the prior art involves the results which differ from those of the serial arithmetic operation.

SUMMARY OF THE INVENTION

It is an object of the present invention to provide a method of generating an object code or program which makes it possible to perform the vector operation for outer loop by transforming variables into such arrays which not only allow the variables having values defined in the outer loop to be used in the inner loop but also allow the variables having the values defined in the inner loop to be replaced by the arrays so that the vectorization processing can be performed for the outer loop.

Another object of the present invention is to provide a compiling method of generating the object code capable of minimizing the size of the array introduced through the expansion, to thereby reduce the requisite capacity of the memory as used.

The above objects can be accomplished by an automated vectorization processing in a compiler which includes steps of detecting connected components linked together by an arc in a data dependence graph indicative of the sequence of definitions and reference of variables thereof in multiple loops to be compiled, replacing the variable by an array for each of the connected components, inserting an assign statement for placing values available before execution of a loop in the array mentioned above immediately before that loop, and inserting an assign statement for replacing the value of the appropriate element in the array by the variable after execution of the above mentioned loop.

Connected components of a flow dependence graph indicative of a sequence of definitions defining the values of variables and references which utilize the values are detected to give different names to the variables having an identical name but employed or utilized in different calculations. For each of the connected components, decision is made as to the necessity of transformation into subscript variable, i.e. the array in accordance with the sequence of the definitions of the variables and the reference in the loop subjected to the vectorization processing. When the expansion is decided to be necessary, the variable is replaced by the array. This array is termed as the temporary array which does not make appearance in the source program but generated by the compiler for the purpose of enhancing the effective performance of the object code. When the values defined in the i-th loop are to be used in the succeeding (i+1)-th loop or in the loop located inside of the one subjected to the vectorization processing, decision is made that the transformation to the array is necessary. This is because data transaction is effected by way of a memory.

When the value employed in a first calculation in a loop subjected to the vectorization processing is defined outside of that loop, the value of the variable available immediately before execution of the loop subjected to the vectorization processing is assigned in the temporary array to be used in the loop subjected to the vectorization processing to thereby assure the initial value. When a value defined in a given loop is to be used outside of that loop, the value of the final element in the temporary array is assigned in the variable in precedence to the substitution to thereby assure the end value of the temporary array. When the given loop includes an inner loop, decision is made as to insertion of the assign statements for assuring the initial value and the end value for the inner loop.

With the arrangement described above, source programs shown in FIGS. 2A, 2B, 2C and 2D of the accompanying drawings are translated into forms illustrated in FIGS. 7A, 7B, 7C and D, respectively, to be subsequently vectorized. In these figures, symbol "..." represents operations which have nothing to do with variable S.

(a) In case the value of a variable defined in the i-th execution of the outer loop is used in the inner loop:

For vectorization of the outer portion including a statement 19 shown in FIG. 2A, it is necessary to distribute "DO 10" loop into two parts immediately before "DO 20" loop as illustrated in FIG. 7A. By replacing the variable S by the temporary array TV1 as shown in FIG. 7A, arithmetic operation or calculation similar to the one illustrated in FIG. 2A can be performed. More specifically, the results of calculation performed for the variable S in each of I where I=1 to N in the "DO 10" loop shown in FIG. 7 are held at TV1 [1: N] and the values of the elements of TV1 are successively substituted for the variable S in the succeeding "DO 11" loop. Then, "DO 20" loop can be vectorized straightforwardly, whereby the calculation similar to the one shown in FIG. 2A can be performed.

(b) In case the value defined in an inner loop at the time of i-th execution in the outer loop is used in the calculation in the (i+1)-th execution in the outer loop:

For the vectorization processing of the outer portion including a statement 21 shown in FIG. 2B, it is necessary to distribute "DO 10" loop into two parts immediately before execution of "DO 20" loop. In order to allow the same calculation to be performed regardless of the distribution, values of the variable S of the statement 22 determined in every execution of the outer loop must be held in an array and modified so that they can be used in the calculation for the statement 21. By replacing the variable S by the temporary array TV1 as illustrated in FIG. 6B, the value of the variable S determined outside of the loop can be used in the calculation for the statement 21' when I=1, while the result of calculation for the statement 22 obtained from the (I - 1)-th execution of the inner loop can be used in calculation for the statement 21' when I>1. Accordingly, even when "DO 20" loop is exchanged by the statement 21', the result of calculation can be assured, which in turn means that the same calculation as the one shown in FIG. 2B can be performed even when the loop is distributed as shown in FIG. 7B.

(c) In case the value defined in the inner loop at the time of the i-th execution in the outer loop is used in the i-th calculation in the outer loop:

For vectorization processing of outer portion including a statement 24 shown in FIG. 2C, it is necessary to distribute "DO 10" loop into two parts immediately after the execution of "DO 20" loop as is shown in FIG. 7C. In order to allow the same calculation to be performed notwithstanding the loop distribution, values of the variable S in a statement 23 calculated in every execution of the outer loop must be held and so modified that they can be used in calculation for a statement 24. By replacing the variable S by the temporary array TV1 as illustrated in FIG. 6C, the value calculated in the inner loop at the time of i-th execution of the outer loop can be used in the I-th calculation for the statement 24. Subsequently, the loop can be distributed as shown in FIG. 7C while allowing the same calculation as the one shown in FIG. 2C to the performed.

(d) In case the value defined at i-th execution of an outer loop is used in the inner loop at (i+1)-th execution of the outer loop:

For vectorization processing involving a statement 26 shown in FIG. 2D, it is necessary to distribute "DO 10" loop into two parts immediately following "DO 20" loop. By replacing the variable S by the temporary array TV1 as shown in FIG. 7D, it is possible to perform the same calculation as the one shown in FIG. 2D. In calculation for a statement 25', value of the variable S determined outside of the loop is employed when I=1, while when I>1, the result of the (I - 1)-th calculation for the statement 26 can be used in the I-th calculation for a statement 25' in the inner loop. Thus, the result of calculation can be assured regardless of replacement of the "DO 20" loop and the statement 26 by each other, whereby the same calculation as the one shown in FIG. 2D can be performed notwithstanding the loop distribution shown in FIG. 7D.

BRIEF DESCRIPTION OF THE DRAWINGS

FIG. 3 is a view illustrating in a flow chart a first expansion processing (9) in FIG. 1;

FIG. 5 is a view illustrating in a flow chart an initial/end value ensuring assign statement inserting procedure (10) shown in FIG. 1;

FIG. 6A is a view showing the result of initial/end value ensuring processing performed for the program shown in FIG. 4A;

FIG. 6B is a view showing the result of initial/end value ensuring processing performed for the program shown in FIG. 4B;

FIG. 6C is a view showing the result of initial/end value ensuring processing performed for the program shown in FIG. 4C;

FIG. 6D is a view showing the result of initial/end value ensuring processing performed for the program shown in FIG. 4D;

FIG. 7A is a view showing the result of loop distribution processing performed for the program shown in FIG. 6A;

FIG. 7B is a view showing the result of loop distribution processing performed for the program shown in FIG. 6B;

FIG. 7C is a view showing the result of loop distribution processing performed for the program shown in FIG. 6C;

FIG. 7D is a view showing the result of loop distribution processing performed for the program shown in FIG. 6D;

FIG. 8A is a view showing the result of expansion processing performed for the inner loop shown in FIG. 7B; and FIG. 8B is a view showing the result of expansion processing performed for the inner loop shown in FIG. 7C.

DESCRIPTION OF THE PREFERRED EMBODIMENTS

Figure 1:
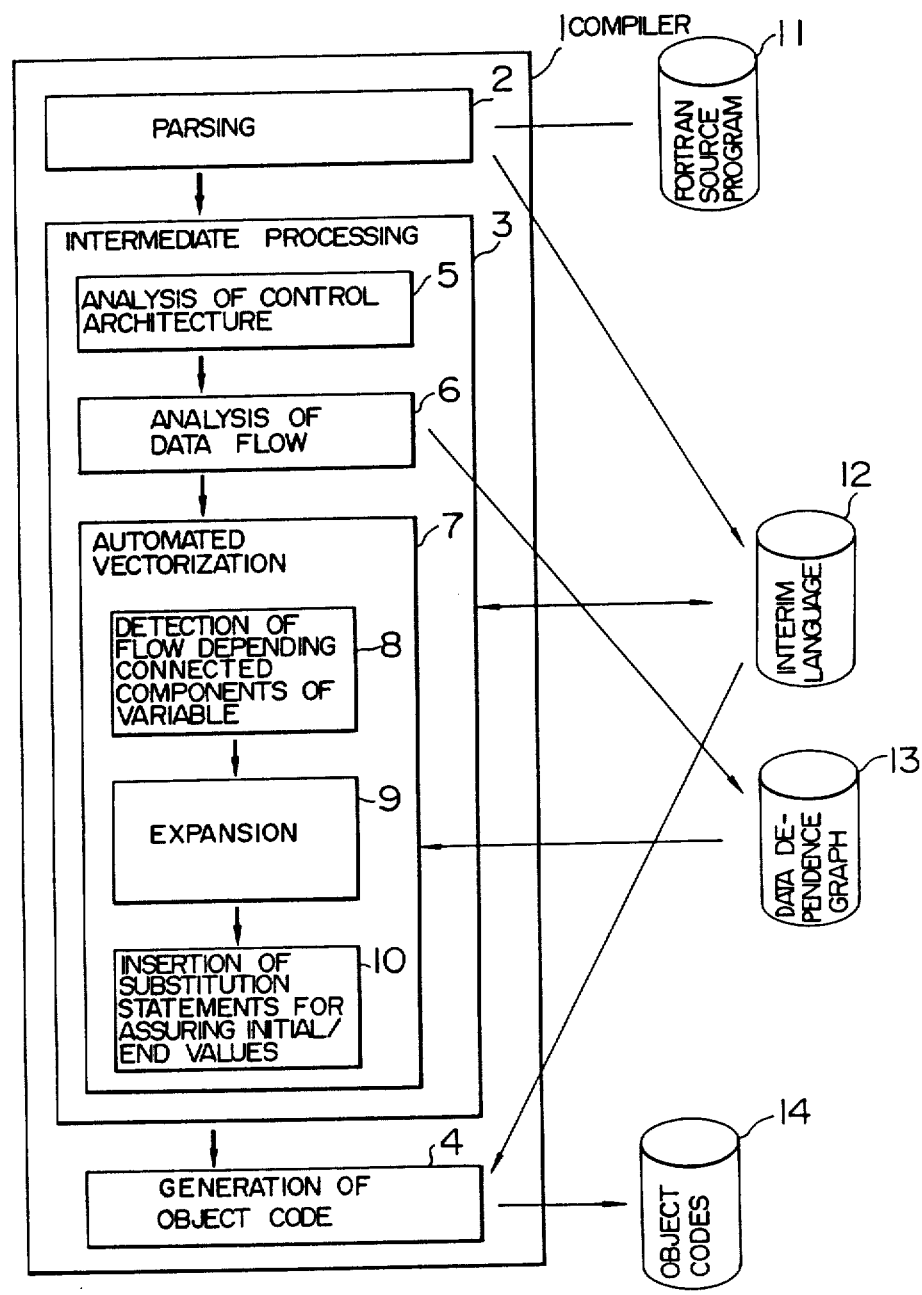
FIG. 1 is a view showing a flow of compiler processing according to the present invention.

Now, the invention will be described in conjunction with an exemplary embodiment thereof assumed as being applied to a FORTRAN compiler by referring to the drawings.

FIG. 1 shows a general arrangement of a compiler 1 to which the present invention can be applied. The compiler 1 receives at an input thereof a FORTRAN source program 11 to perform syntax analysis (parsing) at a processing block 2, as a result of which an interim language is outputted and supplied to vectorization/optimization processing block 3 for transformation of the interim language 12. The transformed interim language is supplied to a processing block 4 for generating an object code 14. One of the important features of the invention resides in the processing 3 which is designed to generate the object code of high vectorization ratio.

In FIG. 1, the processing block 3 is especially arranged for automated vectorization processings, wherein the processing 7 concerns the variable-expansion involved in the automated vectorization processing.

For convenience of description, it is assumed that the source program 11 includes duplicate loops having variables and that values of the variables determined in the outer loop can be utilized in the inner loop and vice versa, wherein the variables are substituted for by arrays. Flow dependence in which a definition statement defining the value of a variable determined arithmetically is connected by an arc with a utility statement which utilizes the above value in another arithmetic operation may be classified into four types illustrated in FIGS. 2A, 2B, 2C and 2D, respectively. In these figures, symbol ". . ." represents arithmetic operations which have nothing to do with the variable S.

Turning back to FIG. 1, a control structure (architecture) analyzing block 5 serves to detect the duplicate loops in the source program 11. Subsequently, in a processing block 6, data flow is analyzed to determine whether or not the concerned data flow has any of such flow dependency relations between the definition statements and utilization statements as indicated by the arcs 27, 28, 29, 30 in FIG. 2. Additionally, in the control structure analysis block 5, it is discriminatively determined whether the flow dependence as detected indicates such dependence in which the value of a certain variable determined arithmetically at the i-th execution in a given loop is used at the i-th execution or indicates such flow dependence in which the above value is used at the (i+1)-th execution. The dependence in which the value determined at the i-th execution is to be used in the i-th calculation is referred to as the loop-independence relation, while the dependence in which the i-th calculated value is used in the (i+1)-th calculation is referred to as the twice loop carried dependence. This sort of data flow analyzing method is known and discussed in Kaneda et al's article entitled "Method for Analyzing Large Range Data Flow of Arrays" appearing in the Periodical of The Information Processing Society of Japan, Vol. 28, No. 6, p.p. 567-576.

The data dependence graphs mentioned above and the interim expressions in the source program constitute input data to the automated vectorization processing indicated by a block 7 in FIG. 1.

In a processing block 8 shown in FIG. 1, variables in the loops subjected to the vectorization are classified with regard to the flow dependence into groups in accordance with the connected components linked together by the arcs on the graph. Parenthetically, the algorithm for detecting the connected components is basic and well known in the field of the graph theory.

In the case of the programs illustrated in FIGS. 2A to 2D, none of them contain more than one connected components. Accordingly, classification of the variable S into the groups mentioned above is impractical.

Subsequently, through the processing designated by the block 9 in FIG. 1, the variable is transformed into a temporary array. This processing is referred to as the variable-expansion or simply as expansion. A relevant processing flow is illustrated in FIG. 3. Since the expansion processing is performed sequentially, starting from the outermost loop, the outer "DO 10" loop is subjected to the processing. At that time, no transformation is made to the variable belonging to the inner loop. This is because the processing is performed independently at every nest level in each loop.

Figure 2A:
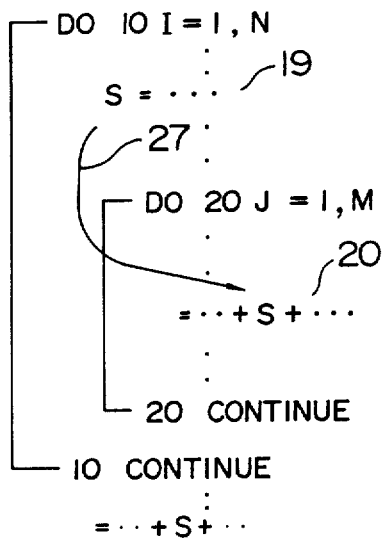
FIG. 2A is a view showing an example of duplicate loops in a source program.
Figure 2B:
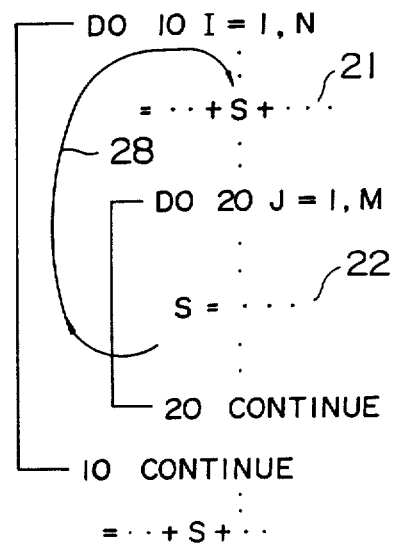
FIG. 2B is a view showing another example of duplicate loops in a source program.
Figure 2C:
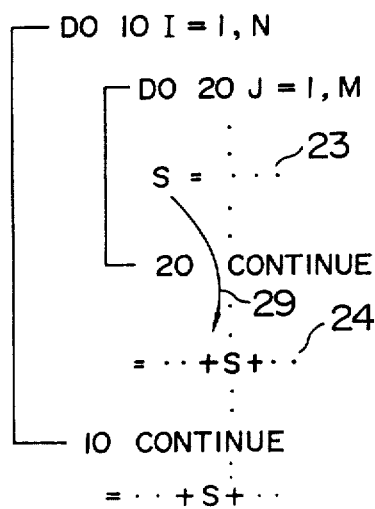
FIG. 2C is a view showing still another example of duplicate loops in a source program.
Figure 2D:
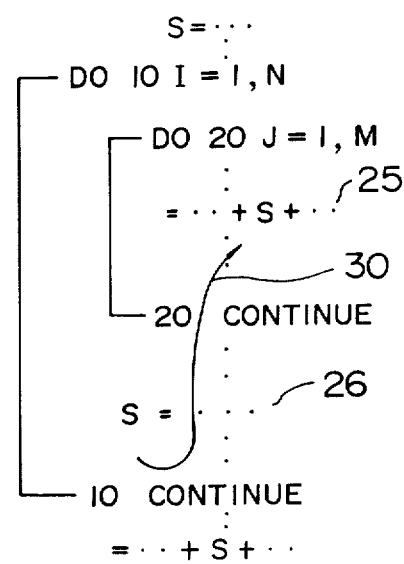
FIG. 2D is a view showing a further example of duplicate loops in a source program.
Figure 4A:
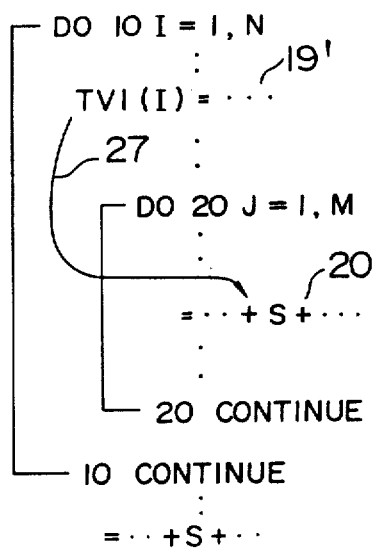
FIG. 4A is a view showing the result of the expansion processing for the program shown in FIG. 2A.

Referring now to FIG. 3, at a step 31, it is decided at a step 31 whether there exists the variable bearing the twice loop transportation dependence, that is, the variable of which value has been determined for a variable having the flow dependence in the connected components detected through the processing 8 and is to be utilized used in the second calculation, as exemplified by the flow dependence 28 shown in FIG. 2B and the flow dependence shown in FIG. 2D. At a processing step 33, when a variable having the twice loop carried dependence and utilized for defining the value of a variable referred to as the definition-point oriented variable exists in the loop subjected to the expansion processing 9, the defini- tion-point oriented variable located at the definition point is transformed into an array attached with a subscript (I+1) where I represents the number of times the loop subjected to the expansion is to be repeated. By way of example, the variable S appearing in the statement illustrated in FIG. 2B is a variable to be defined in the inner loop and thus is not subjected to the expansion processing when the expansion processing 9 is performed for the outer loop. On the other hand, the variable S appearing in the statement 26 shown in FIG. 2D is a variable to be defined in the outer loop, and thus is transformed into the temporary array TV1 (I+1) when the expansion processing 9 is done for the outer loop, where I represents the number of times the outer loop is to be repeated, as a result of which the statement 26' shown in FIG. 4D is generated. When a variable (referred to as the reference-point oriented variable) which has the aforementioned twice loop carried dependence and which is located at such a position where the same value defined for the definition-point oriented variable applies valid is found in the loop subjected to the expansion processing 9, either the processing 35 or the processing 34 is executed in dependence on whether or not the loop carriability exists in the flow dependence between the definition-point oriented variable and the reference-point oriented variable. More specifically, when no loop carriability exists between the processings 35 and 34, i.e. when the variable defined at the i-th execution in a certain loop is to be utilized at the same execution in the same loop, the corresponding reference-point oriented variable is transformed into the array with subscript I where I represents the number of times the concerned loop is repeated (processing 34). On the other hand, when the loop carriability exists between the processings 34 and 35, i.e. when the variable defined at the i-th execution is to be utilized at the (i+1)-th execution, the reference-point oriented variable is transformed into the array with subscript (I+1), where I represents the number of times the concerned loop is to be repeated (processing 35). An example of such variable, there can be mentioned the variable S in the statement illustrated in FIG. 2B. By transforming this variable S into the temporary array TV1 with subscript (I), the statement 21' shown in FIG. 4B can be generated.

Unless the flow dependence of the twice loop carried is detected at the decision step 31 shown in FIG. 3, it is then decided at a step 32 whether or not the counterpart for that flow dependence exists in the inner loop. If the result of the decision step 32 is affirmative (YES), the variable in the loop subjected to the expansion processing is transformed to an array attached with the subscript I representing the number of times that loop is repeated independently of whether that variable is the definition-point oriented variable or the reference point oriented variable. At this time, no expansion is performed on the variable belonging to the inner loop, as exemplified by the variables S appearing in the statements 19 and 24 shown in FIGS. 2A and 2C, respectively. As will be seen in both statements, the variable S is transformed into a temporary array TV1 with the subscript (I) where I represents the number of times the outer loop is repeated, whereby the statements 19' and 24' shown in FIGS. 4A, respectively, are prepared. The processing described above and illustrated in FIG. 3 is executed also for the inner loop. In this manner, the variable-expansion processing 9 (FIG. 1) comes to an end.

Finally, through the processing 10 for inserting a substitution statement to ensure the initial value and the end values for the array-transformed variables for the individual loops in precedence and in succession to execution of the relevant outer loop and inner loop, respectively. A flow of this processing is illustrated in a flow chart in FIG. 5. More specifically, the processing mentioned below is performed on all the temporary arrays until completion of the processing has been decided at a step 46.

In a decision step 47, it is discriminatively determined whether the array-transformed variable corresponds to the reference point where the value of the variable is used or the definition point where the value of the variable is determined. In the latter case, it is decided at a decision step 48 whether or not the flow dependence reaches outside of the duplicate loop being processed for the purpose of assuring the end values to the duplicate loop. In case the flow dependence reaches outside of the duplicate loop being processed, a statement for substituting the original variable value for the value of the final element of the array is inserted through the processing 49.

In the case of the examples illustrated in FIGS. 4A, 4B, 4C and 4D, the assign statements 60, 61, 62 and 63 are inserted immediately after the respective "DO 10" loops, as illustrated in FIGS. 6A to 6D, respectively.

At a decision step 50, the need for assuring the initial value for the inner loop is determined in dependence on whether the flow dependence reaches the inner one of the duplicate loops being processed. In case the flow dependence reaches the inner loop, an assign statement for assuring the initial value for the inner loop is inserted immediately before that inner loop. When the flow dependence to the inner loop is of loop independence, a statement for substituting the original variable for the value of the element represented by the same subscript as that of the definition-point oriented subscript is inserted immediately before the inner loop, as exemplified by the statement 19' shown in FIG. 4A. More specifically, in the case of the definition point for the statement 19', the statement for substituting the variable S for the value of the I-th element is inserted immediately before the inner loop, which results in the statement 56 shown in FIG. 6A. When the flow dependence on the inner loop is of the twice loop carried dependence, then a statement for substituting the original variable for the element value represented by the subscript corresponding to the one of the definition point but decremented by "1" is inserted immediately before the inner loop, as exemplified by the statement 26' shown in FIG. 4D. As will be seen, the statement for substituting the value of the I-th element designated by the subscript smaller by "1" than that of the definition point of the statement 26' is inserted immediately before the inner loop, to thereby prepare the statement 59 shown in FIG. 6D.

In the case in which the array-transformed variable corresponds to the definition point, it is determined at a decision step 52 whether there exists the need for assuring the initial value for the relevant loop in dependence on whether the flow dependence outside of that loop is effective or not. When the flow dependence outside of the loop is effective, a statement for substituting the value of the original variable for the first element is inserted immediately before the concerned loop through the processing indicated by a block 53, as exemplified by the statements shown in FIGS. 6B and 6D, respectively. As will be seen, statements 64 and 65 are inserted immediately before the respective "DO 10" loops for placing the values in the first element of TV1.

At a decision step 54, it is decided whether need for assuring the end value of the inner loop exists in dependence on whether or not the flow dependence of the inner loop reaches the concerned loop. In case the flow dependence from the inner loop is effective, a statement for assuring the end value of the inner loop is inserted immediately after that inner loop through the processing indicated by a block 55. On the other hand, when the flow dependence from the inner loop is of loop independence, a statement for substituting the value of the original variable for the element designated by the same subscript as that of the reference point is inserted immediately after the inner loop, as exemplified by the statement 24' shown in FIG. 4C. As with the case of the reference point of the statement 24', a statement for substituting the value of the variable S for the first element is inserted immediately after the inner loop, to prepare the statement 58 shown in FIG. 6C. When the flow dependence on the inner loop is of twice loop transportation dependence, a statement for substituting the value of the original variable for the element designated by the subscript greater by "1" than that of the reference point is inserted immediately after the inner loop, as exemplified by the statement 21' shown in FIG. 4B. More specifically, a statement for substituting the value of the variable S for the (I+1)-th element designated by the subscript greater by "1" than the subscript I of the reference point is inserted immediately after the inner loop, to prepare a statement 57 shown in FIG. 6B.

Through the procedure described above, the expansion of the outer loop for the variables bearing the dependence relation to the inner loop has been completed. By virtue of the variable-expansion, movement of statements is permitted. Additionally, vectorization of the outer loop can be effectuated by executing the processing of loop division before and after the inner loop.

Figure 4B:
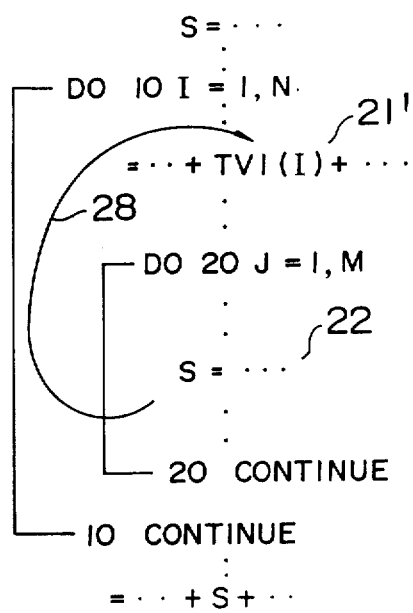
FIG. 4B is a view showing the result of the expansion processing for the program shown in FIG. 2B.
Figure 4C:
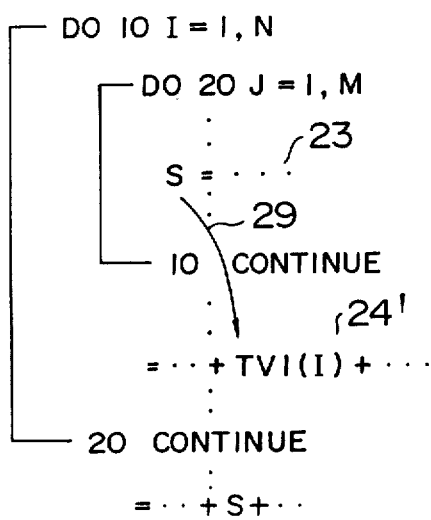
FIG. 4C is a view showing the result of the expansion processing for the program shown in FIG. 2C.
Figure 4D:
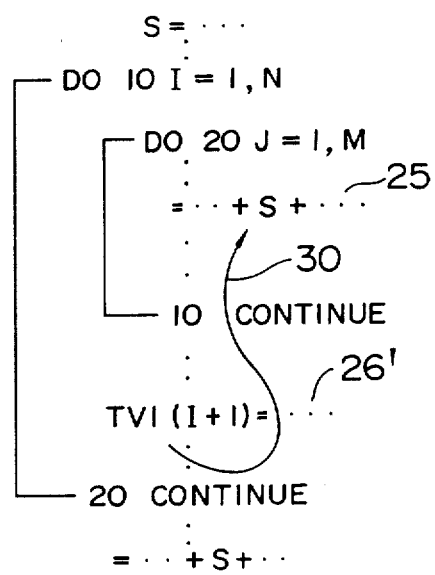
FIG. 4D is a view showing the result of the expansion processing for the program shown in FIG. 2D.

Referring to FIGS. 7B and 7D, the statements 21' and 26' are so moved that the same arithmetic operations as those on the statements shown in FIGS. 4B and 4D can be performed even in the case where the outer loop is divided.

Subsequently, the variables S in the inner loop "DO 20" shown in FIGS. 7A, 7B, 7C and 7D are replaced by arrays, if such replacement or substitution is decided to be necessary. The statements 20 and 25 shown in FIGS. 7A and 7D utilize only the value of the variable S and require no new definition internally of "DO 20" loop. Accordingly, it is decided that no flow dependence relation exists, whereby no expansion is carried out. On the other hand, statements shown in FIGS. 7B and 7C can be translated into those shown in FIGS. 8A and 8B through the processing described herein before in conjunction with the preceding embodiment.

Figures 8A, 8B:
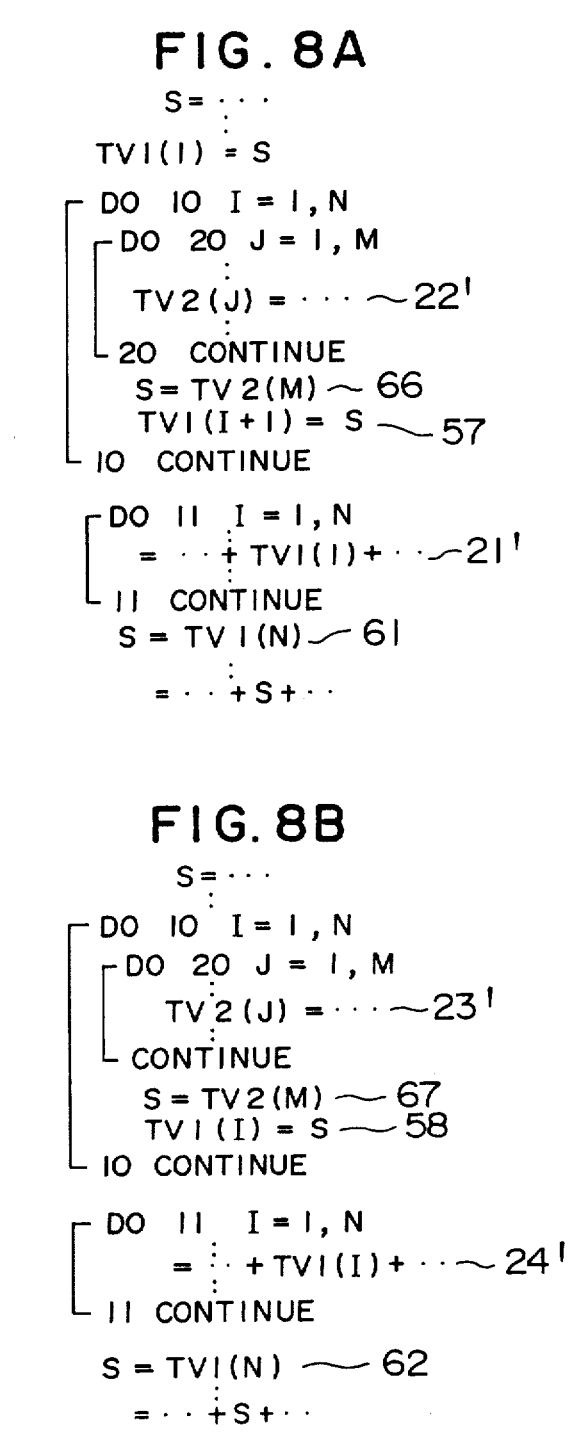

In this manner, the object codes which allow the vector operation unit to be used effectively can be prepared by transforming the loops "DO 10" and "DO 20" shown in FIG. 7A, the loops "DO 10" and "DO 20" shown in FIG. 7B, the loops "DO10" and "DO 20" shown in FIG. 8A and the loops "DO 20" and "DO 11" shown in FIG. 8B into the forms susceptible to the vectorization processing.

As will be appreciated from the foregoing description, it is now possible according to the present invention to transform into array the variable having definition for determining the value thereof and reference for utilizing the value over multiple loops by way of a memory having a minimum requisite capacity. Accordingly, the loops including an internal loop can be handled in a manner similar to the innermost loop and transformed into the form susceptible to the vectorization processing through the program translation for vectorization such as movement of the statement. In other words, these loops which have not heretofore been subject to the vectorization can be vectorized in addition to the innermost loop according to the teaching of the present invention. As a result, the range in which the vectorization is applied is widened, being accompanied with increase in the vectorization ratio, which in turn means that the efficiency at which the object code to be generated can be correspondingly increased.

We claim:

1. A method for compiling a computer source program for execution on a machine which utilizes vector registers, comprising the steps of:
   (a) detecting loop control structures within the source program;
   (b) identifying variables common to a plurality of loop control structures and a function of the identified common variable within each loop control structure;
   (c) analyzing loop dependencies for a variable within a loop control structure;
   (d) mapping the identified common variables and the analyzed loop dependencies into a data dependence graph;
   (e) transforming the identified common variables in the data dependence graph into temporary arrays, the subscript of the temporary arrays having a predetermined relationship to the loop dependencies of the identified common variables;
   (f) inserting control statements into the source program to preserve the initial and final values of the transformed common variables at the start and end, respectively, of the loop control structures, the inserted control statements having a predetermined relationship to the identified function of the identified common variables;
   (g) moving the loop control structures containing the inserted control statements and the temporary arrays to eliminate the analyzed loop dependencies in the data dependence graph; and,
   (h) vectorizing the temporary arrays within the loop control structure which have had the analyzed loop dependencies eliminated.

2. A computer-implemented compiling method for converting a source program into an object program, said object program including vector instructions to be executed by a vector processor, comprising the steps executed by a computer of:
   (a) detecting, among sentences belonging to a multiple DO Loop portion (FIG. 2A; FIG. 2D) of a source program, a first sentence (19 (FIG. 2A); 26 (FIG. 2D) which defines a value of variables and a second sentence (20 (FIG. 2A); 25 (FIG. 2B)) which uses the value of the variable, wherein the first sentence belongs to a portion outside of an inner DO loop within the multiple DO loop portion and the second sentence belongs to the inner DO loop;
   (b) modifying the multiple DO loop portion to form a single DO loop (DO 10 loop in FIG. 7A; DO 10 loop in FIG. 7D) and a modified DO loop portion (DO 11; DO 20loop portion in FIG. 7B or 7C) to be executed after the single DO loop, wherein the single DO loop comprises one or plural sentences belonging to the portion outside of the inner DO loop at the multiple DO loop portion of the source program, with the variables in the first sentence being replaced by one (TV1(1) in 19' (FIG. 7A); TV1(I+1) in 26' (FIG. 7D) of elements (TV1(1), I=1,N (FIG. 7A-7D)) of an array which one element has a subscript (I) which is dependent on a DO loop control variable (I) of an outer loop of the multiple DO loop portion of the source program and wherein the modified DO loop includes a third sentence (56 (FIG. 7A); 59 (FIG. 7B)) located before an inner loop of the modified multiple loop portion which third sentence uses one element belonging to the array so as to define a value of the variable by a value of the element and includes, inside an inner loop thereof, one or plural sentences belonging to the inner loop of the multiple DO loop portion of the source program; and
   (c) converting the single DO loop and the modified multiple DO loop portion into an object program to be executed by a vector processor, wherein the object program includes one or plural vector instructions corresponding to at least to the single DO loop.

3. A compiling method according to claim 2, wherein, when the first sentence (19 (FIG. 2A)) is located before the inner DO loop of the multiple DO loop portion of the source program, the one element (TV1(I) in 19' (FIG. 7A)) of the array used to replace the variable and the one element (TV1(I) in 56' (FIG. 7A) of the array used by the third sentence (56) have a subscript (I) equal in value to a DO loop control variable (I) of the outer DO loop of the multiple DO loop portion of the source program.

4. A compiling method according to claim 2, wherein, when the first sentence (26, FIG. 2D) is located after the inner DO loop of the multiple DO loop of the source program the one element (TVI(I+1) in 26' (FIG. 7D)) of the array to replace the variable has subscript used to replace the variable has a subscript (I+1) next to the subscript (I) of the outer DO loop control variable (I) of the outer DO loop of the multiple DO loop of the source program and the one element (TV1(I) in 59 (FIG. 7D)) of the array used by the third sentence (59) has a subscript equal in value to a DO loop control variable (I) of the outer DO loop of the multiple DO loop portion of the source program.

5. A computer-implemented compiling method for converting a source program into an object program, said object program including vector instructions, to be executed by a vector processor, comprising the steps of:
   (a) detecting, among sentences belonging to a multiple DO loop portion (FIG. 2B; FIG. 2C) of a source program, a first sentence (22 (FIG. 2B); 23 (FIG. 2C)) which defined a value of a variable and a second sentence (21 (FIG. 2b); 24 (FIG. 2C)) which uses the value of the variable wherein the first sentence belongs to an inner DO loop (DO 20 loop in FIG. 2B or 2C) within the multiple DO loop portion and the second sentence is located outside the inner DO loop;
   (b) modifying the multiple DO loop portion to form a single DO loop (DO 11 loop in FIG. 7B or 7C) and a modified multiple DO loop portion (DO 10, DO 20 loops in FIG. 7B or 7C) to be executed before the single DO loop, wherein the single DO loop comprising one or pluraly sentences belonging to the portion outside of the inner DO loop of the multiple DO loop portion before modification by the step (b), with the variable in the second sentence being replaced by one (TV1(I) in 21' in FIG. 7B; TV(I) in 24' in FIG. 7C) of elements of an array which one element has a subscript (1) which is dependent on a DO loop control variable (1) of an outer loop of the multiple DO loop portion of the source program and wherein the modified multiple DO loop includes, after an inner loop of the modified multiple loop portion, a third sentence (57 (FIG. 7B); 58 (FIG. 7C)) which uses one element (TV1 (I+1) in 57 (FIG. 7B); TV1(I) in 58 (FIG. 7C)) belonging to the array so as to define a value of the element by a value of the variable, and includes, inside inner loop of the modified multiple loop, one or plural sentences belonging to the inner loop of the multiple DO loop portion of the source program; and (c) converting the single DO loop and the modified multiple DO loop portion into an object program to be executed by a vector processor, wherein the object program includes one or plural vector instructions corresponding at least to the single DO loop.

6. A compiling method according to claim 5, wherein, when the second sentence (24 in FIG. 2C) is located after the inner loop of the multiple DO loop portion of the source program, the one element (TV1(I) in 24' in FIG. 2C) of an array used to replace the variable and the one element (TV1(I) in 58 (FIG. 7C)) used by the third sentence (58 (FIG. 7C)) have an element number (I) equal in value to a DO loop control variable (I) of the outer DO loop of the multiple DO loop portion of the source program.

7. A compiling method according to claim 5, wherein, when the second sentence (21 (FIG. 2B)) is located before the inner loop of the multiple DO loop portion of the source program, the one element (IV1(I +1) in 57 in FIG. 7B) of the array used by the third sentence (57) has a subscript (I+1) next to the subscript (I) equal in value to a DO loop control variable (1) of the outer DO loop of the multiple DO loop portion of the source program and the one element (TV1(I) in 58 (FIG. 7B)) of the array used to replace the variable has a subscript (I) equal in value to a DO loop control variable (I) of the outer loop of the multiple DO loop portion of the source program.

* * * * *